United States Patent [19]

Lee

[11] 4,446,268

[45] May 1, 1984

[54] COMPOSITIONS

[75] Inventor: Garland G. Lee, Mt. Vernon, Ind.

[73] Assignee: General Electric Company, Mt. Vernon, Ind.

[21] Appl. No.: 402,209

[22] Filed: Jul. 26, 1982

[51] Int. Cl.³ .................... C08K 5/10; C08L 69/00
[52] U.S. Cl. .................... 524/315; 524/610; 524/611
[58] Field of Search .................... 524/315, 611, 610

[56] References Cited

U.S. PATENT DOCUMENTS

| | | | |
|---|---|---|---|
| 3,186,961 | 6/1965 | Sears | 524/315 |
| 3,784,595 | 1/1974 | Schirmer | 524/315 |
| 3,836,499 | 9/1974 | Schirmer et al. | 524/315 |
| 3,893,966 | 7/1975 | Stein et al. | 524/315 |
| 4,065,436 | 12/1977 | Adelmann | 525/462 |
| 4,131,575 | 12/1978 | Adelmann | 524/311 |
| 4,143,024 | 3/1979 | Adelmann | 524/611 |
| 4,256,851 | 3/1981 | Taylor et al. | 524/315 |
| 4,327,007 | 4/1982 | Vanderkooi et al. | 524/315 |
| 4,399,251 | 8/1983 | Lee | 524/609 |
| 4,408,000 | 10/1983 | Lee | 524/315 |
| 4,409,351 | 10/1983 | Lee | 524/609 |

FOREIGN PATENT DOCUMENTS

| | | | |
|---|---|---|---|
| 2729485 | 1/1978 | Fed. Rep. of Germany | 526/611 |
| 47-41092 | 10/1972 | Japan . | |
| 50-14745 | 2/1975 | Japan | 524/315 |
| 50-50459 | 5/1975 | Japan | 524/315 |
| 53-81580 | 7/1978 | Japan | 524/315 |

Primary Examiner—C. Warren Ivy
Attorney, Agent, or Firm—Martin B. Barancik

[57] ABSTRACT

Asymmetric carboxylic acid ester having a long chain alcohol component are effective mold release agents in thermoplastic resins, ester of the formula

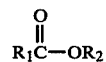

wherein $R_1$ is alkyl of from one to about five carbon atoms, inclusive; and $R_2$ is alkyl of from about ten to about thirty carbon atoms, inclusive or monoalkenyl of from about ten to about thirty carbon atoms, inclusive, with the provisos that unsaturation is not on the carbon attached to the oxygen and the ester is essentially non volatizable under processing conditions.

11 Claims, No Drawings

COMPOSITIONS

BACKGROUND OF THE INVENTION

Useful articles from various thermoplastic resins have been prepared from molds for many years. Injection molding provides a convenient way for preparing various articles from thermoplastic resins, particularly objects of a relatively intricate nature. In order to accomplish a release of the resin from the mold, various mold release agents have been found which provide for a release of the resin with lower ejection pressure. Such an agent should be chemically compatible with the resin as measured by the usual characteristics of the resin under normal conditions and heat treatments.

Of the thermoplastic resins which find a mold release agent useful from time to time one of the most sensitive to chemical interaction is the polycarbonates.

A series of patents disclosing the use of various carboxylic acid esters as mold release agents for polycarbonates have been recently issued: U.S. Pat. Nos. 4,065,436; 3,836,499; 4,131,575 and 3,784,595. Additionally carboxylic acid esters have been known as plasticizers for polycarbonate in U.S. Pat. No. 3,186,961. Still further Japanese patent publication No. 47-41092 discloses various esters including butyl stearate and the natural product beeswax as mold release agents for polycarbonate.

A new class of mold release agents for thermoplastic resins in general and polycarbonates in particular has been discovered.

SUMMARY OF THE INVENTION

In accordance with the invention, there is a composition comprising a thermoplastic resin in admixture with an injection mold releasing effective amount of an ester of the formula

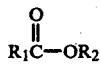

$$R_1\overset{O}{\underset{\|}{C}}-OR_2 \qquad I$$

wherein $R_1$ is an alkyl of from one to about five carbon atoms, inclusive, and $R_2$ is alkyl of from about ten to about thirty carbon atoms, inclusive or monoalkenyl of from about ten to about thirty carbon atoms, inclusive with the provisos that (1) the unsaturation is not on the carbon atom attached to the oxygen and (2) the ester is essentially non volatizable under molding conditions.

Examples of various thermopastic resins which are within the invention include polycarbonates, polyesters, polysulfones, polyethersulfones, polyamides, polysulfides, polyacrylates, polyurethanes, polyolefins, polyvinylhalides, acrylonitrile butadiene styrene, butadiene styrenes, methacrylate butadiene styrenes and the like and blends of the above with each other or a further thermoplastic resin. The preferred thermoplastic resin is an aromatic carbonate polymer.

Aromatic carbonate polymers are prepared in the conventional manner by reacting a dihydric phenol with a carbonate precursor in an interfacial polymerization process. Typical of some of the dihydric phenols that may be employed in the practice of this invention are 2,2 bis(4-hydroxyphenyl)propane (bisphenol-A), (2,2-bis(4-hydroxy-3-methylphenyl)propane, 4,4-bis(4-hydroxyphenyl)heptane, 2-2(3,5,3′,5′-tetrachloro-4,4′-dihydroxydiphenyl)propane, 2,2-(3,5, 3′,5′-tetrabromo4,4′-dihydroxydiphenyl)propane, (3,3′-dichloro-4,4′-dihydroxyphenyl)methane, bis 4-hydroxy phenyl sulfone and bis 4-hydroxy phenyl sulfide. Other dihydric phenols of the bisphenol type are also available and are disclosed in U.S. Pat. Nos. 2,999,835; 3,028,365 and 3,334,154. Bisphenol-A is preferred.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di(chlorophenyl) carbonate, di-(bromophenyl) carbonate, di-(trichlorophenyl) carbonate, di-(tribromophenyl) carbonate, etc., di-(alkylphenyl) carbonate such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols bis-chloroformates of hydroquinone, or glycols (bishaloformates of ethylene glycol, neopentyl glycol, polyethylene glycol, etc.). While other carbonate precursors will occur to those skilled in the art, carbonyl chloride, also known as phosgene, is preferred.

The polycarbonate polymers of this invention may be prepared by employing a molecular weight regulator, an acid acceptor and a catalyst. The molecular weight regulators which can be employed in carrying out the process of this invention include monohydric phenols such as phenol, chroman-1, paratertiarybutylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptyl-ammonium iodide, tetra-n-propyl ammonium; bromide, tetramethylammonium chloride, tetramethyl ammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also included herein are branched polymers wherein a polyfunctional aromatic compound is reacted with the dihydric phenol and carbonate precursor to provide a thermoplastic randomly branched polycarbonate polymer.

These polyfunctional aromatic compounds contain at least three functional groups which are carboxyl, carboxylic anhydride, haloformyl, hydroxyl (tri or tetrahydric phenols) or mixtures thereof. Examples of these poly-functional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polymer and a branched polymer.

Within the definition of polycarbonate are also copolyester-carbonates, that is the polymer made from a dihydric phenol, a dibasic acid and a phosgene precursor. U.S. Pat. No. 3,169,121 covering copolyester-carbonates and methods of preparing them is hereby incorporated by reference.

The method of preparing the thermoplastic resins other than the aromatic polycarbonates are equally well known, consequently no detailed procedures of preparation are necessary.

The mold release agents of this invention are esters of Formula I. As used in the formula and throughout the specification and claims, alkyl includes normal and branched alkyl groups. Illustrative examples of alkyl groups of one to five and ten to thirty carbon atoms, inclusive, include methyl, ethyl, propyl, isobutyl, pentyl, decyl, 2,4,6-trimethyldodecyl, octadecyl, eicosyl, docosyl, triacontasyl, and the like.

Monoalkenyl as used in the formula and throughout the specification and claims include 3-decenyl, 2,4-diethylnonen-5-yl, cis-9-octadecenyl, 8-eicosenyl, and the like as illustrative examples.

Illustrative examples of compounds of Formula I are behenyl butyrate, palmityl acetate, myristyl propionate, dodecyl 2-methyl butyrate, cis-9-octadecyl butyrate and the like.

Preferred compounds of Formula I have from about 14 to about 30 carbon atoms in $R_1$ and $R_2$ together. Further preferred compounds of Formula I have from 2 to 4 carbon atoms in $R_1$ and from about 16 to about 26 carbon atoms in $R_2$. Alkyl groups for $R_2$ are generally preferred over alkenyl groups. Of the alkyl groups, normal alkyl is preferred over branched alkyl. When unsaturation is on the carbon atom attached to the oxygen, degradation of the ester can occur at processing conditions. In order for the ester to perform its function as a mold release agent it must be present in the polymer melt at processing temperature.

An effective mold releasing amount of the ester is employed in the thermoplastic composition. Any amount of ester which reduces the amount of pressure needed to eject the article from the injection mold and obtain an unblemished article in comparison to the pressure needed to eject the thermoplastic composition control, (i.e., no ester) is an effective mold releasing amount. In general, effective amounts of the ester are from about 0.01 to about 2.0 weight percent, based on the quantity of thermoplastic resin present, preferably from about 0.05 to about 0.5 weight percent. The ester can be added to the resin in the normal manner that the other additives are added, for example, in the dry stage and coextruded or in a solvent and melt extruded with the resin.

Other additives in common use in the thermoplastic resins may also be employed. For example with respect to aromatic carbonate polymer, additives which are commonly known to stabilize the resin thermally such as a phosphite can be employed. Hydrolytic stabilizers such as epoxides may also be employed as well as agents which are flame retardants, drip inhibitors, ductility enhancer, antioxidants, solvent resistance enhancer, ultraviolet light stabilizers and various inert fillers. Active fillers and pigments can be used with passivating agents and treatments. Of course other mold release agent(s) can be used in admixture with the ester of the Formula.

Below is a specific example of the invention in comparison with other known ester mold release agents. The examples are intended to illustrate but not narrow the inventive concept. All percentages of the additives are in weight percent of the thermoplastic resin.

EXAMPLE 1

In all the ensuing examples the aromatic polycarbonate is Lexan®140, a polymer produced by reacting bisphenol-A and phosgene. The mold release agent was dry formulated into the polycarbonate at levels of 0.3 weight percent unless otherwise stated. Also present in the composition is 0.03 weight percent of a phosphite stabilizer.

EXAMPLE 2

In a 125 ton Cincinnati injection molding machine with a 4 ounce shot capacity, various mold release agents were tested. The mold used was a 3"×3" box with a 1½" wall height. It has ejector pins at four corners with one of the pins being attached to a strain gauge transducer for measuring the part ejection pressure. The mold was designed with very little draft so that the part would tend to stick to the core unless mold release is used. To vary the amount of shrinkage on the core, the temperature of the stationary and moving mold halves could be varied.

The molding conditions employed were those below:

TABLE 1

| Clamp Conditions: | |
|---|---|
| Clamp Pressure psi/ton | 125 |
| Melt Conditions: | |
| Nozzle, °F. | 544 |
| Front Zone, °F. | 547 |
| Middle Zone, °F. | 541 |
| Back Zone, °F. | 510 |
| Melt Temperature (measured), °F. | 570 |
| Screw Conditions: | |
| RPM | 34 |
| Shot Size, inches | 1⅝ |
| Injection Conditions: | |
| Injection Pressure, psi | 14,000 |
| Injection Pressure Time, sec. | 3 |
| Cushion, inches | None |
| Injection Fill Time, sec. | 2 |
| Molding Conditions: | |
| Cure Time, sec. | 40 |
| Mold Temperature (Stationary), °F. | 165 |
| Mold Temperature (Moving), °F. | 115 |

Below are the values in pounds per square inch in arithmetic mean plus or minus two standard deviations.

TABLE II

| MOLD RELEASE AGENT<br>Control (no mold release agent) | EJECTOR PIN PRESSURE<br>PSI $\bar{x} + 2\gamma$<br>Pins punched through on first shot |
| --- | --- |
| PETS[1] | 10,430 ± 96 |
| Stearyl behenate[2] | 7,550 ± 163 |
| Oleayl oleate[3] | 7,805 ± 214 |
| Butyl myristate[4] | 6,940 ± 167 |
| Butyl stearate[5] | 5,750 ± 163 |
| Arachidyl propionate[6] | 4,545 ± 110 |

[1] Pentaerythritol tetrastearate from Hercules
[2] Loxiol G-47 from Henkel
[3] Wicklen - manufacturers claim acid number <1.0
[4] Wicklen - manufacturers claim approximately 98% purity and acid number <1.0
[5] Shamrock
[6] Wicklen - a mixture of $C_{18}$-$C_{28}$ fatty alcohol ester of propionate, the main constituent being arachidyl propionate. Acid number <1.0.

The values from the above table are significant. Polycarbonate having PETS, a commercially employed mold release agent ester requires a high amount of pressure to effect release from the mold. The long chain symmetrical esters reduce the ejection pressure somewhat as shown by the stearyl and oleayl esters. The asymmetric esters utilizing the long chain acids, myristoyl and stearoyl reduce the ejection pressure still further. However, where the asymmetric ester reduces the pressure substantially is where the ester utilizes a long chain fatty alcohol arachidyl propionate. The difference in results is surprising.

EXAMPLE 3

In a manner similar to Example 2, arachidyl propionate, hexacosyl ($C_{26}$) propionate and palmityl butyrate are added to a polyester, polysulfone, polyethersulfone, polyamide, polysulfide, polyacrylate, polyurethane, polyolefin, polyvinylhalide, acrylonitrile butadiene styrene, butadiene styrene or methacrylate butadiene styrene. Similar mold release results should be obtained.

What is claimed is:

1. A composition comprising a thermoplastic resin selected from the group consisting of aromatic carbonate, polysulfone, polyethersulfone, polyamide, polysulfide, polyurethane, polyvinylhalide, acrylonitrile butadiene styrene, butadiene styrene or methacrylate butadiene styrene in admixture with an injection mold releasing effective amount of an ester of the formula

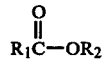

wherein $R_1$ is alkyl of from one to about five carbon atoms, inclusive; and $R_2$ is alkyl of from about ten to about thirty carbon atoms, inclusive or monoalkenyl of from about ten to about thirty carbon atoms, inclusive, with the provisos that the unsaturation is not on the carbon attached to the oxygen and the ester is essentially non volatizable under processing conditions.

2. A composition in accordance with claim 1 wherein $R_2$ is alkyl.

3. A composition in accordance with claim 2 wherein $R_1$ and $R_2$ are normal, $R_1$ is from 2 to 4 carbon atoms, inclusive, and $R_2$ is from about 16 to about 26 carbon atoms, inclusive.

4. A composition in accordance with claim 3 wherein the ester is arachidyl propionate.

5. A composition in accordance with claim 3 wherein the quantity of ester is from about 0.01 to about 2.0 weight percent of thermoplastic resin.

6. A composition in accordance with claim 1 wherein the thermoplastic resin is an aromatic carbonate polymer.

7. A composition in accordance with claim 6 wherein $R_2$ is alkyl.

8. A composition in accordance with claim 7 wherein $R_1$ and $R_2$ are normal, $R_1$ is 2 to 4 carbon atoms, inclusive and $R_2$ is from about 16 to about 26 carbon atoms, inclusive.

9. A composition in accordance with claim 8 wherein the ester is arachidyl propionate.

10. A composition in accordance with claim 8 wherein the quantity of ester is from about 0.01 to about 2.0 weight percent of the thermoplastic resin.

11. A composition in accordance with claims 6, 8, 9 or 10 wherein the aromatic carbonate polymer is derived from bisphenol A and a carbonate precursor.

* * * * *